Aug. 31, 1954

W. C. BAKER 2,687,652

RIGHT-ANGLE DRIVE TRANSMISSION

Filed Jan. 24, 1952

INVENTOR:
Willard C. Baker,
BY
Myron J. Seibold
ATTORNEY.

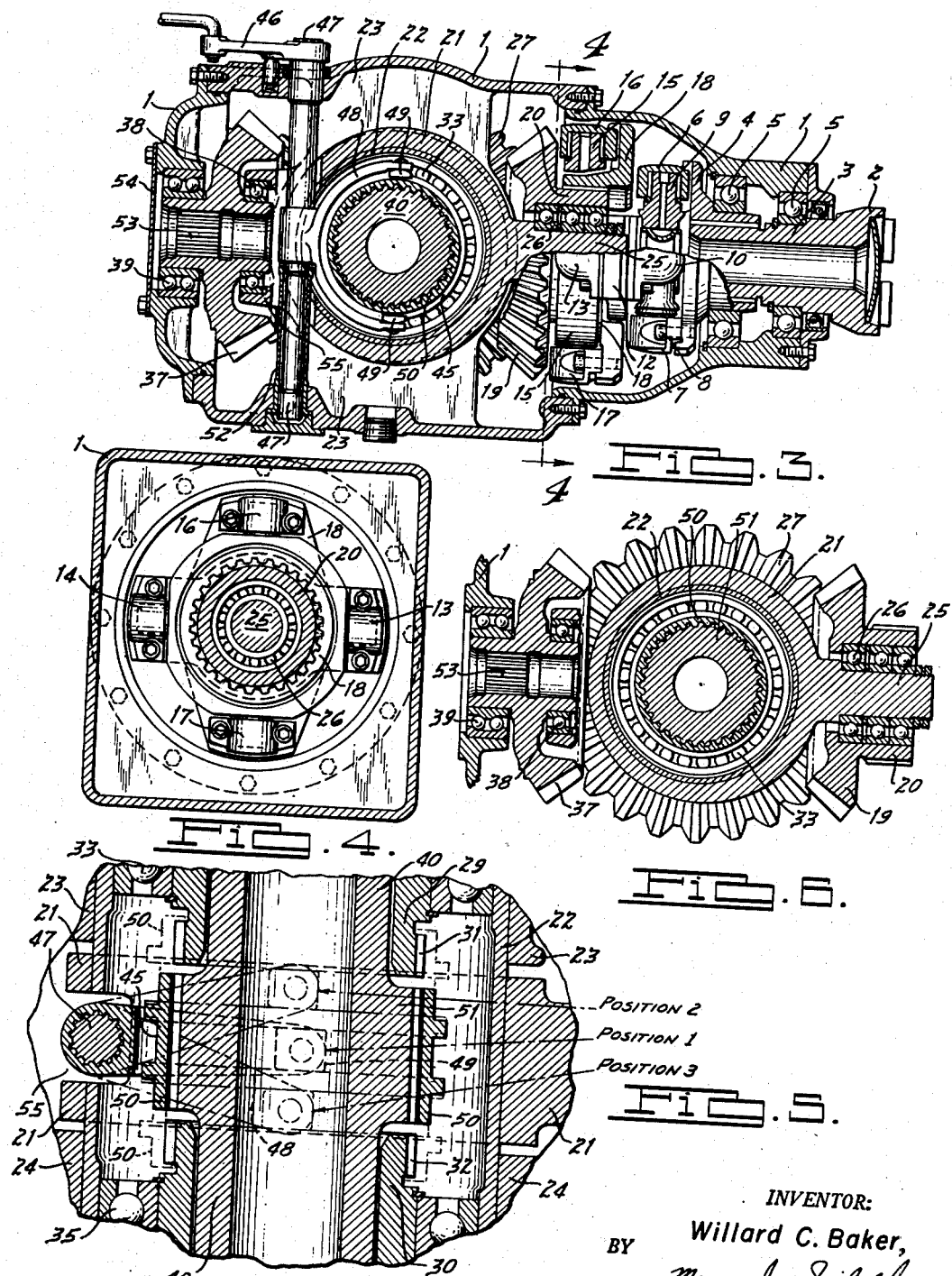

Patented Aug. 31, 1954

2,687,652

UNITED STATES PATENT OFFICE 2,687,652

RIGHT-ANGLE DRIVE TRANSMISSION

Willard C. Baker, Jackson, Mich., assignor to Jered Industries, Inc., Hazel Park, Mich., a corporation of Michigan Application January 24, 1952, Serial No. 268,043

15 Claims. (Cl. 74—378)

This invention relates to the transmission of power and more particularly to a right angle drive transmission of the bevel gear type which enables the power to be transmitted from a rotating power input shaft to a power output shaft which is perpendicular to the power input shaft.

An object of this invention is to provide two paths for the transmission of power from the input shaft to the perpendicular output shaft thereby reducing the tooth loads on the bevel gears.

A further object of this invention is to eliminate loading upon the bevel gear bearings due to unbalanced separating forces and tangential gear tooth forces which accompany gear tooth loads in right angle drives heretofore designed.

A more specific object of the present invention is to provide a power transmitting mechanism for delivering power from a driving member to a driven member wherein the mechanism includes a first gear connected to the driving member and a second gear connected to the driven member, and wherein intermediate gears are individually engaged with each of the first and second gears.

Another object of the present invention is to provide a power transmitting mechanism according to the preceding object wherein one of the plurality of gears is mounted for limited universal floating movement with respect to the other gears.

One specific form of mechanism, according to the preceding objects and which is illustrated and described in accordance with the patent statutes, comprises a yoke which encircles the axis of the output shaft, an input bevel gear which is mounted on the arm of the yoke, and a close coupled double universal joint which connects the input gear with a power source and which enables the input bevel gear to revolve about its own axis and also to undergo displacement in a plane which is perpendicular to this axis as the yoke undergoes angular deflection about the axis of the power output shaft. The input gear which is mounted in this novel manner engages two perpendicular bevel gears which in turn are interconnected with an idler pinion. Either of the perpendicular bevel gears is adapted to be drivably connected to a driven member. The idler gear and the perpendicular bevel gear which is not connected to the driven member serve to transfer the driving torque of the input gear to the remaining bevel gear so as to provide a second driving engagement.

The following specification and the accompanying drawings describe and illustrate the novel features of this invention.

Fig. 3 is a vertical sectional view of the transmission taken on the line 3—3 of Fig. 2 together with part shown in elevation.

Fig. 4 is a transverse sectional view on line 4—4 of Fig. 3.

Fig. 5 is a detail sectional view taken on the plane of Fig. 2 showing the operation of a reversing mechanism.

Fig. 6 is a partial sectional view showing the relative position of the input bevel gear.

Figure 1:
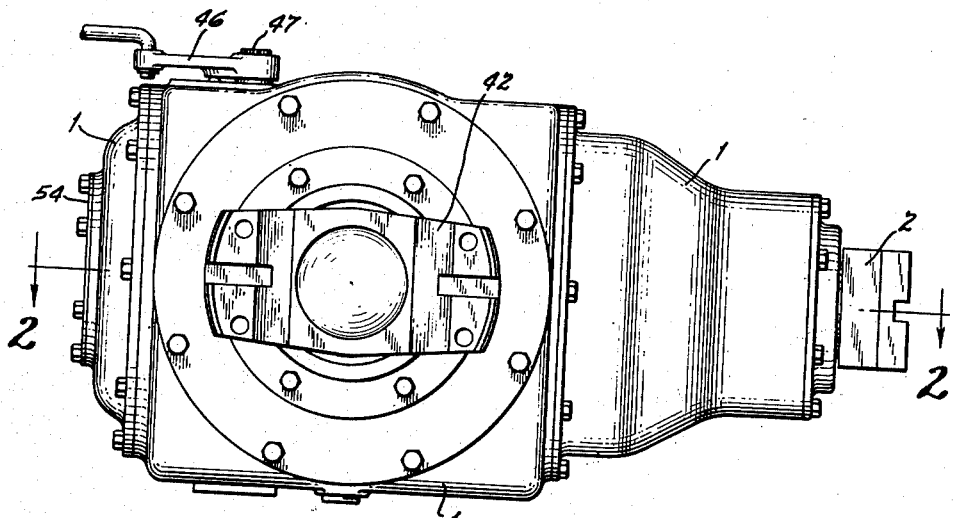
Fig. 1 is a side view of the right angle drive transmission showing the outside of the housing.
Figure 2:
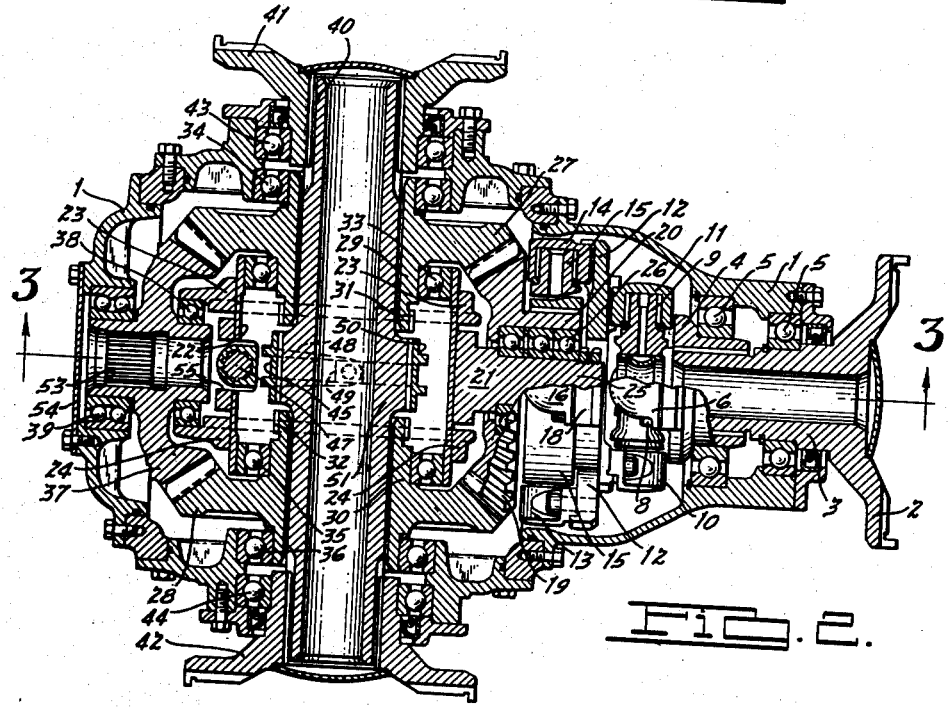
Fig. 2 is a horizontal sectional view of the transmission taken on the line 2—2 of Fig. 1 with part shown in elevation.

Referring more particularly to Figs. 1, 2 and 3, numeral 1 designates the transmission housing and 2 the flange on the power input shaft 3. This flange is drivably connected to a drive shaft, not shown. The power input shaft 3 is splined to end hub 4 of the double universal joint as shown in Figures 2 and 3. This input shaft 3 is securely mounted between the retaining walls of the housing by suitable bearings, 5, which permit the input shaft to rotate freely about its own axis. By means of bolts 8, the end hub 4 is bolted securely to universal joint caps 6 and 7 which are mounted upon a diametrically opposed pair of the four equally spaced radial studs on the universal joint spider member 9. The caps 6 and 7 are free to undergo angular movement about the axis of the studs upon which they are mounted. The two remaining studs of the spider member 9 have similarly mounted upon them caps 10 and 11.

Caps 10 and 11 are in turn bolted securely to the universal joint centerplate 12 which provides a support upon which universal joint caps 13 and 14 are bolted. Caps 13 and 14 are mounted on the face opposite to the face supporting caps 10 and 11 upon two diametrically opposed radial studs which are integral with spider member 15. As similarly pointed out in regard to spider member 9, caps 13 and 14 are free to undergo angular deflection with respect to the axis of the studs upon which they are mounted. The two remaining studs of the spider member 15 are similarly rotatable within caps 16 and 17 which are in turn bolted securely to adapter 18. Adapter plate 18 has a central hub which is internally splined on the hub 20 of the input bevel gear 19. The input bevel gear 19 has an extended hub 20 which is externally splined and which engages the internally splined adapter 18. There is then provided a solidly engaged rotatable assembly consisting of the bevel gear 19, adapter 18 and caps 16 and 17.

By virtue of the double universal joint just described, the input bevel gear 19 is free to move in a vertical plane and at the same time rotate about its own axis. It is possible for the axis of the input shaft to be at a different angle with respect to a horizontal reference line than the axis of the input bevel gear. Furthermore, it is not necessary that the axis of the bevel gear and input shaft 3 should intersect. Because of the freedom of motion of this input bevel gear, it may appropriately be termed a floating pinion.

A yoke 21 encircles a cylindrical shell 22 and is slidably supported by it. The cylindrical shell 22 is in turn supported by parallel webs 23 and 24 which are extensions of the outer housing casting 1 and are integral with it. In this particular embodiment the shell 22 is secured to the two webs by means of a press fit. Yoke 21 has an extended arm 25 upon which the input bevel gear 19 is rotatably mounted.

Fig. 2 shows two bevel gears, 27 and 28, which will be hereinafter referred to as output bevel gears. Both output bevel gears 27 and 28 have extended hubs, 29 and 30, upon which two external splines, 31 and 32 respectively, are located. Output bevel gear 27 is mounted upon suitable bearings 33 and 34. Bearing 33 is backed up by the cylindrical shell 22 which in turn is firmly supported by webs 23 and 24. Bearing 34 is backed up by the outer housing casting 1. Output bevel gear 28 is similarly mounted by bearings 35 and 36, bearing 35 being backed up by the cylindrical shell 22 and bearing 36 being backed up by the outer housing.

Figures 2 and 3 show a fourth bevel gear 37 which engages the two output bevel gears 27 and 28. This fourth bevel gear is mounted upon two suitable bearings 38 and 39 which are in turn backed up by the webs 23 and 24 and by the outer housing 1 respectively. The main function of this fourth bevel gear is to provide a path for the transmission of power from one output bevel gear to the other, as will be explained subsequently. This fourth bevel gear therefore is appropriately termed the idler gear and it will be hereinafter referred to by this name.

A hollow shaft 40, which will hereinafter be referred to as the power output shaft, is concentric with the two output bevel gears 27 and 28, and extends through the transmission perpendicularly to the power input shaft 3. Located outside of the outer housing 1 are two output flanges 41 and 42 which are securely splined to the two ends of the power output shaft 40. The power absorbing devices are drivably connected to these two output flanges but are not shown. The sub-assembly consisting of the output shaft 40 and the two flanges 41 and 42 is end supported by two bearings 43 and 44 which are in turn mounted in the outer housing 1. The two output bevel gears 27 and 28 are independently revolvable upon the power output shaft 40. Oil seals are located at the bases of the power output flanges 41 and 42 and the power input flange 2.

A shifting lever 46 is splined to a rotatable shaft 47 which has splined thereon a fork 48. The two extremities of the shifting yoke 48 have mounted thereon shoes 49 which are situated inside the peripheral groove 45 located in shifter 50. The center portion 51 of output shaft 40 is externally splined and mates with the internally splined shifter 50. The rotary motion imparted to the shifting fork 48 by the shifting lever 46 causes the shifter to move in an axial direction along the splined center portion 51 of the output shaft. A hollow tube 52 is embedded at one end thereof in the housing 1 and acts as a cantilever support for the shaft 47 which is assembled concentrically with respect to the tube 52. To avoid interference with tube 52, yoke 21 and the cylindrical shell 22 are cut away thereby producing a slot 55 through which tube 52 extends.

In the operation of this invention, input bevel gear 19 is continually rotated in one direction by means of the close coupled double universal joint which is interposed between the power input shaft 3 and the input bevel gear. Referring to Fig. 5, position No. 1 of the shifting yoke 48 is the neutral position wherein the output bevel gears 27 and 28 will be driven in opposite directions while the power output shaft 40 remains stationary.

When the shifting yoke 48 is moved to position No. 2, the shifter 50 moves along the splined center portion 51 of the power output shaft 40 until it engages with the external spline 31 on the hub extension 29 of output bevel gear 27 thus effecting a locked engagement of the power output shaft 40 and the output bevel gear 27 which causes the output flanges 41 and 42 and the power output shaft 40 to turn together.

When the shifting yoke 48 is moved to position No. 3, the shifter 50 engages with spline 32 thus causing the output flanges 41 and 42 to rotate together in the opposite direction.

For purposes of illustration in more particular detail, the power input flange 2 will be considered as being driven continually in a clockwise direction when the transmission is viewed from the input side and shifting yoke 48 will be assumed to be in position No. 2. When torque is applied to the input flange 2, the input bevel gear 19 begins to rotate in a clockwise direction by virtue of the operation of the close coupled double universal joint. Before tooth contact occurs at the mesh with the output bevel gear 27, the input bevel gear 19 must rotate until the backlash at this mesh is taken up. If the axis of the input bevel gear 19 is made to coincide with the axis of the power input shaft, as in the case of conventional right angle drive transmissions, and no provision is made for angular displacement of the axis of the input bevel gear about the centerline of the output shaft 40, then the idler gear 37 cannot deliver power from output bevel gear 28 to output bevel gear 27. The path of power flow therefore would be from the power input flange 2 and the power input shaft 3 to the close coupled double universal joint to output bevel gear 27 then to spline 31 which is locked to splined portion 51 by shifter 50 and then to the power output flanges 41 and 42.

On the other hand, with a drive embodying this invention, two paths of power flow are provided. The second path is provided by compensating for the backlash of the meshes between the input bevel gear 19 and output bevel gear 28, between output bevel gear 28 and idler gear 37, and between idler gear 37 and output bevel gear 27. When torque is applied to the power input shaft the input bevel gear 19 has a tendency to ride up on output bevel gear 27 with which it meshes by virtue of its free floating characteristic. The only restraint offered to this tendency to ride up is the gear load which is produced at the mesh with the output bevel gear 28. By virtue of the fact that part of the input torque is now being absorbed by output bevel gear 28 in this manner, the backlash will be taken up and a positive engagement will result between the two output bevel gears 27 and 28 through idler gear 37 thus permitting the transfer of power from output bevel gear 28 to output bevel gear 27 which in turn transfers it to the power output shaft 40. The amount of vertical displacement of the input bevel gear which is necessary is equal to one fourth the sum of the backlash between input bevel gear 19 and output bevel gear 28, between output bevel gear 28 and idler gear 37, and between idler gear 37 and output bevel gear 27 less one fourth the backlash between the input bevel gear 19 and output bevel gear 28.

The free floating characteristic of the input bevel gear 19 will also permit its self positioning so as to prevent premature gear failure arising out of a zero backlash condition.

The bearing loads on the gears are considerably reduced because of the fact that each gear tooth load is balanced by an equal force in the opposite direction on a gear tooth disposed 180 deg. from it. The only bearing loads on the output bevel gears are thrust loads created by the holding forces.

Furthermore the gear load on any one tooth of the output bevel gears will be approximately half as great as the load which would be produced if only one path of power flow were provided because the required load is distributed between two meshes.

In addition to supplying a second path for power flow, idler gear 37 also provides an incidental advantageous feature in that power may be taken off by mating an externally splined power output shaft with the idler spline 53. Cover plate 54 may be removed to make this idler spline accessible.

It is also apparent that a right angle drive of this type will permit the use of a so called full range reverse when it is used on applications where a conventional multispeed transmission is used to transfer power from the source to the power input flange of the right angle drive. Such an arrangement is particularly suited to a track laying vehicle wherein the two power output flanges of the right angle drive deliver power to the sprockets. The full range of forward speeds in the conventional transmission can be utilized when the output shaft is going in the reverse direction merely by changing the position of the shifter 50 in the right angle drive.

It is thus seen from the foregoing description that the applicant has devised a means for providing a double path for the transfer of power from one shaft to another in a power transmission in which the shafts are interconnected through gearing. This means makes use of the basic concept of mounting one of the interengaged gears for limited floating movement with respect to the remaining gears.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

I claim:

1. In a right angle drive transmission, an input shaft, an input gear connected to said shaft for limited universal movement relative thereto while driven by said shaft, means mounting said gear for limited movement about an axis perpendicular to the axis of said shaft, a pair of output gears meshing with said input gear, an idler gear meshing with said pair of output gears, an output shaft, and means for connecting one of said output gears to said output shaft to effect rotation thereof with power transmitted thereto through both of the output gears.

2. In a right angle drive transmission, an input shaft an input gear connected to said shaft for limited universal movement relative thereto while driven by said shaft, means for mounting said gear for limited movement about an axis perpendicular to the axis of said shaft, a pair of output gears meshing with said input gear, an idler gear meshing with said pair of output gears, an output shaft, and means for connecting one of said output gears to said output shaft to effect rotation thereof, the movement of said input gear about the perpendicular axis being sufficient to compensate for the backlash of the input gear, the unconnected output gear, the idler gear and the connected output gear and effect a positive engagement of said gears whereby power is transmitted to the output shaft through both of the output gears.

3. In a right angle drive transmission, an input shaft, an input gear connected to said shaft for limited universal movement relative thereto while driven by said shaft, means mounting said gear for limited movement about an axis perpendicular to the axis of said shaft, a pair of output gears meshing with said input gear, an idler gear meshing with said pair of output gears, an output shaft, and means for connecting either of said output gears to said output shaft to effect rotation thereof in opposite directions with power transmitted to the shaft through both of the output gears.

4. In a right angle drive transmission, an input shaft, an input gear connected to said shaft for limited universal movement relative thereto while driven by said shaft, means mounting said gear for limited movement about an axis perpendicular to the axis of said shaft, a pair of output gears meshing with said input gear, an idler gear meshing with said pair of output gears, an output shaft, and means for connecting either of said output gears to said output shaft to effect rotation thereof in opposite directions, the movement of said input gear about the perpendicular axis being sufficient to compensate for the backlash of the input gear, the unconnected output gear, the idler gear and the connected output gear and effect a positive engagement of said gears whereby power is transmitted to the output shaft through both of the output gears.

5. In a right angle drive transmission, an input shaft, an input gear connected to said shaft for limited universal movement relative thereto while driven by said shaft, means mounting said gear for limited movement about an axis perpendicular to the axis of said shaft, a pair of output gears meshing with said input gear, an idler gear meshing with said pair of output gears, an output shaft, and means for connecting one of said output gears to the output shaft while the other output gear is connected to the output shaft through said idler gear and said one output gear, said input gear rotating about said perpendicular axis to take up backlash and drive the output shaft through both output gears.

6. In a right angle drive transmission, an input shaft, an input gear normally disposed with its axis of rotation substantially concentric with the axis of said shaft, a double universal joint interconnecting said gear and shaft, means mounting said gear for limited movement about an axis perpendicular to the axis of said shaft, a pair of output gears meshing with said input gear, an idler gear meshing with said pair of output gears, an output shaft, and means for connecting either of said output gears to said output shaft to effect rotation thereof in opposite directions with power transmitted to the shaft through both of the output gears.

7. In a right angle drive transmission, an input shaft, an input gear normally disposed with its axis of rotation concentric with the axis of said shaft, a double universal joint interconnecting said gear and shaft, means mounting said gear for limited movement about an axis perpendicular to the axis of said shaft, a pair of output gears meshing with said input gear, an idler gear meshing with said pair of output gears, an output shaft, and means for connecting one of said output gears to said output shaft to effect rotation thereof, the movement of said input gear about the perpendicular axis being sufficient to compensate for the backlash of the input gear, the unconnected output gear, the idler gear and the connected output gear and effect a positive engagement of said gears whereby power is transmitted to the output shaft through both of the output gears.

8. In a right angle drive transmission, an input shaft, an output shaft disposed with its axis perpendicular to the axis of the input shaft, a pair of output gears mounted with their axes concentric with the axis of the output shaft, an input gear meshing with said output gears, means mounting said input gear for limited rotation about the axis of said output shaft, means connecting said input gear to said input shaft for universal movement relative thereto while being rotated thereby, an idler gear meshing with both said output gears, and means for connecting either of said output gears to the output shaft for rotation thereof in opposite directions with power supplied through both output gears.

9. In a right angle drive transmission, an input shaft, an output shaft disposed with its axis perpendicular to the axis of the input shaft, a pair of output gears mounted with their axes concentric with the axis of the output shaft, an input gear meshing with said output gears, means mounting said input gear for limited rotation about the axis of said output shaft, a double universal joint connecting said input shaft to said input gear, an idler gear meshing with both said output gears, and means for connecting either of said output gears to the output shaft for rotation thereof in opposite directions with power supplied through both output gears.

10. In a right angle drive transmission, an input shaft, an output shaft disposed with its axis perpendicular to the axis of the input shaft, a pair of output gears mounted with their axes concentric with the axis of the output shaft, an input gear meshing with said output gears, means mounting said input gear for limited rotation about the axis of said output shaft and with the axis of rotation of the input gear normally substantially concentric with the axis of the input shaft, means connecting said input gear to said input shaft for universal movement relative thereto while being rotated thereby, an idler gear meshing with both said output gears, and means for connecting either of said output gears to the output shaft for rotation thereof in opposite directions with power supplied through both output gears.

11. In a right angle drive transmission, an input shaft, an output shaft disposed with its axis perpendicular to the axis of the input shaft, a pair of output gears mounted with their axes concentric with the axis of the output shaft, an input gear meshing with said output gears, means mounting said input gear for limited rotation about the axis of said output shaft and with the axis of rotation of said input gear normally substantially concentric with the axis of the input shaft, a double universal joint connecting said input shaft to said input gear, an idler gear meshing with both said output gears, and means for connecting either of said output gears to the output shaft for rotation thereof in opposite directions with power supplied through both output gears.

12. In a right angle drive transmission, an input shaft, an input gear having its axis normally substantially concentric with the axis of the input shaft, a driving connection between said input shaft and input gear providing for a limited eccentric positioning of the axis of the input gear relative to the axis of the input shaft, an output shaft having its axis perpendicular to the axis of the input shaft, a pair of output gears meshing with said input gear, an idler gear meshing with said pair of output gears, means mounting said input gear for limited rotation about the axis of the output shaft, and means for connecting either of said output gears to the output shaft for rotation thereof in opposite directions with power supplied through both output gears.

13. A power transmitting mechanism for delivering power from a rotating driving means to a driven shaft comprising a first gear drivably connected to said driving means, a second gear adapted to be connected to said driven shaft and drivably engaged with said first gear, a third gear engaged with said first gear, a fourth gear engaged with said second gear and said third gear to provide a second driving engagement with said second gear, and means for mounting one of said gears for limited displacement in a direction transverse to the axis thereof.

14. In a power transmitting mechanism, a power input gear, a pair of driven gears engaged with said input gear, another gear engaged with each of said driven gears thereby providing a positive driving gear train therethrough between said input gear and one of said driven gears, a power output shaft, means for connecting said one driven gear to said output shaft, and means for mounting one of said gears to permit displacement in a direction transverse to the axis thereof.

15. In a power transmitting mechanism, a power input gear, a pair of driven gears engaged with said input gear, a power output shaft, means for connecting either of said driven gears to said output shaft, another gear engaged with each of said driven gears thereby providing a positive driving gear train therethrough between said input gear and the driven gear connected to the output shaft, and means for mounting one of said gears for limited displacement in a direction transverse to the axis thereof.

References Cited in the file of this patent

UNITED STATES PATENTS

| Number | Name | Date |
| --- | --- | --- |
| 1,403,913 | Pennington | Jan. 17, 1922 |
| 2,514,262 | Schmitter | July 4, 1950 |